(12) United States Patent
Miwa et al.

(10) Patent No.: US 8,963,625 B2
(45) Date of Patent: Feb. 24, 2015

(54) SEMICONDUCTOR DEVICE DRIVEN BY A MAIN POWER SUPPLY VOLTAGE AND AN AUXILIARY POWER SUPPLY VOLTAGE

(71) Applicant: Renesas Electronics Corporation, Kawasaki (JP)

(72) Inventors: Yuichiro Miwa, Hyogo (JP); Masahiro Kitamura, Hyogo (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 14/152,406

(22) Filed: Jan. 10, 2014

(65) Prior Publication Data

US 2014/0125405 A1    May 8, 2014

Related U.S. Application Data

(62) Division of application No. 13/558,763, filed on Jul. 26, 2012, now Pat. No. 8,653,884.

(30) Foreign Application Priority Data

Sep. 15, 2011  (JP) ................. 2011-201616

(51) Int. Cl.
*G05F 3/02*  (2006.01)
*G06F 1/26*  (2006.01)

(52) U.S. Cl.
CPC . *G05F 3/02* (2013.01); *G06F 1/263* (2013.01)
USPC .......... 327/538; 327/540; 327/545; 327/403; 307/18; 307/29; 307/64; 307/85

(58) Field of Classification Search
CPC .................... G05F 3/02; G06F 1/263
USPC .......... 327/99, 403, 404, 405, 407, 408, 594, 327/495, 538, 530, 540, 541, 543, 544, 545, 327/546; 307/29, 141, 18, 19, 20, 21, 23, 307/24, 25, 28, 31, 44, 46, 48, 64, 65, 66, 307/71, 85, 86, 87, 126, 130, 132 R, 132 EA
See application file for complete search history.

(56) References Cited

U.S. PATENT DOCUMENTS

| 4,617,473 A | 10/1986 | Bingham |
| 5,608,273 A | 3/1997 | Bartlett |
| 5,886,561 A | 3/1999 | Eitan et al. |
| 6,118,188 A | 9/2000 | Youssef |
| 7,142,038 B2 | 11/2006 | Baglin |

(Continued)

FOREIGN PATENT DOCUMENTS

JP    08-235077 A    9/1996

*Primary Examiner* — Jung H Kim
(74) *Attorney, Agent, or Firm* — Foley & Lardner LLP

(57) ABSTRACT

A microcomputer includes a first switch coupled between a main power supply terminal and a power supply node, and a second switch coupled between an auxiliary power supply terminal and the power supply node. The microcomputer compares a voltage V1 of the main power supply terminal with a reference voltage VR1. When V1>VR1, the microcomputer turns on the first switch and turns off the second switch, and when V1<VR1, the microcomputer turns off the first switch, and turns on/off the second switch to gradually increase a voltage V3 of the power supply node. Thus, the operation of a clock generation circuit driven by V3 can be stable even when V3 is changed from V1 to V2.

2 Claims, 12 Drawing Sheets

(56) References Cited

U.S. PATENT DOCUMENTS

| | | |
|---|---|---|
| 7,800,433 B2 | 9/2010 | Yoshikawa et al. |
| 2010/0231048 A1 | 9/2010 | Chen et al. |
| 2010/0301673 A1 | 12/2010 | Riedel et al. |
| 2012/0217809 A1* | 8/2012 | Sato et al. .................. 307/64 |
| 2012/0261994 A1* | 10/2012 | Nikolov et al. ............. 307/66 |

* cited by examiner

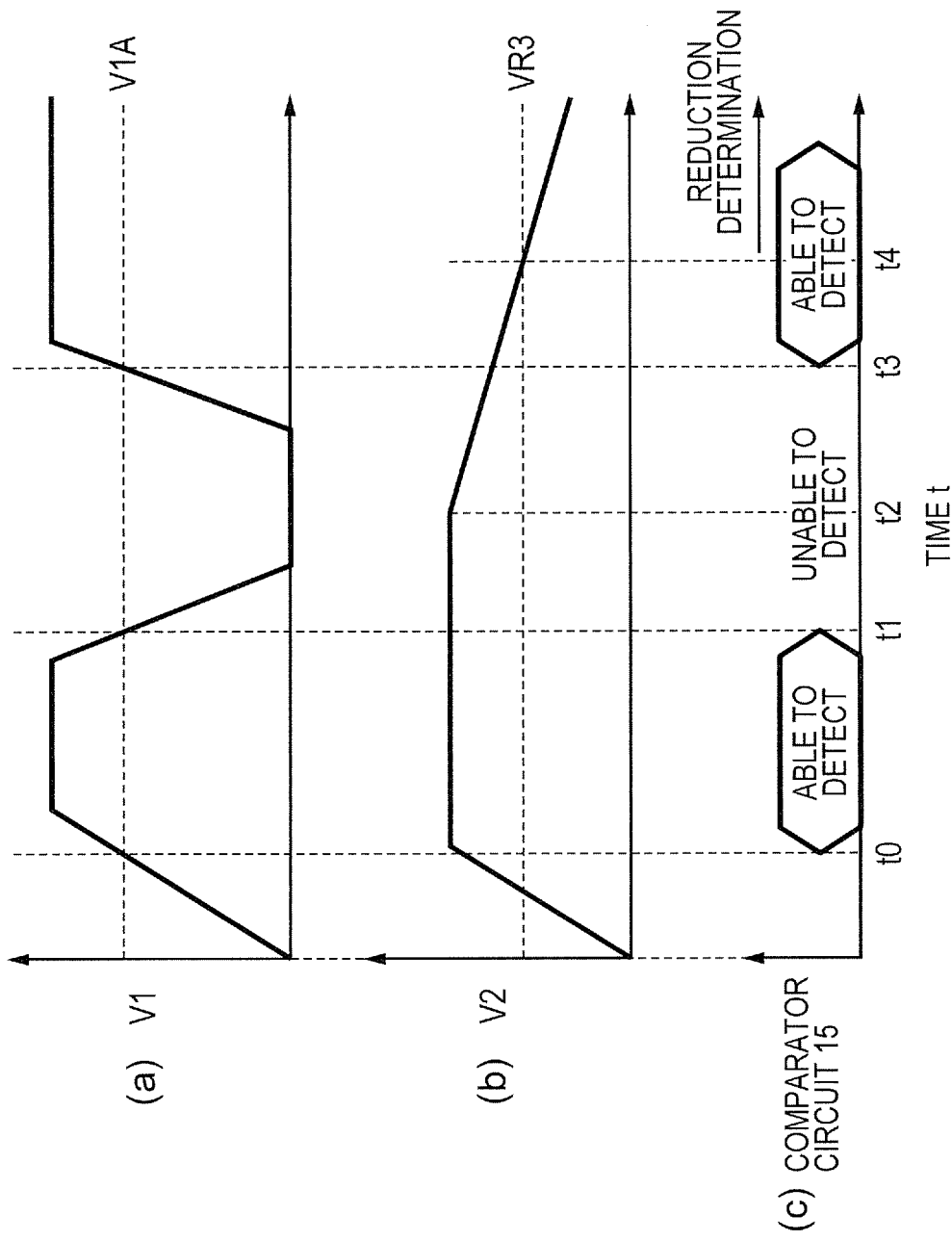

SEMICONDUCTOR DEVICE DRIVEN BY A MAIN POWER SUPPLY VOLTAGE AND AN AUXILIARY POWER SUPPLY VOLTAGE

CROSS-REFERENCE TO RELATED APPLICATIONS

This application is a divisional of U.S. application Ser. No. 13/558,763, filed Jul. 26, 2012, which claims benefit of priority from the prior Japanese Application No. 2011-201616 filed on Sep. 15, 2011; the entire contents of all of which are incorporated herein by reference.

BACKGROUND

The present invention relates to a semiconductor device, and more particularly, to a semiconductor device driven by the main power supply voltage and auxiliary power supply voltage.

Semiconductor devices of the related art include a power supply terminal for receiving a main power supply voltage, a switch coupled between the power supply terminal and a power supply node, a first internal circuit driven by the voltage of the power supply terminal, a second internal circuit driven by the voltage of the power supply node, and an auxiliary power supply coupled to the power supply node.

When the main power supply voltage is supplied, the switch is turned on. The first and second internal circuits are driven by the main power supply voltage. At the same time, the auxiliary power supply is charged. If the main power supply voltage is interrupted, the operation of the first internal circuit is stopped and the switch is turned off. Then, the second internal circuit is driven by the auxiliary power supply voltage (see, for example, Japanese Unexamined Patent Publication No. Hei 9 (1996)-235077).

SUMMARY

However, the existing microcomputers have a problem that when the difference between the main power supply voltage and the auxiliary power supply voltage is large, the operation of the second internal circuit is unstable when the driving voltage of the second internal circuit is changed from the main power supply voltage to the auxiliary power supply voltage.

Thus, the main aspect of the present invention is to provide a semiconductor device capable of operating stably.

A semiconductor device according to the present invention includes a first power supply terminal for receiving a main power supply voltage, and a second power supply terminal for receiving an auxiliary power supply voltage. The semiconductor device controls the switching of the output from the main power supply voltage to the auxiliary power supply voltage so that the variation of the voltage is below a predetermined value.

In the semiconductor device according to the present invention, it is possible to reduce the variability of the voltage supplied to the internal circuit in the switching of the output from the main power supply voltage to the auxiliary power supply voltage.

BRIEF DESCRIPTION OF THE DRAWINGS

FIGS. 12A to 12C are timing charts illustrating the operation of the microcomputer shown in FIG. 11.

DETAILED DESCRIPTION

First, the outline of a semiconductor device according to the present invention and the effect thereof will be described. The semiconductor device according to the present invention includes a first power supply terminal for receiving a main power supply voltage, a second power supply terminal for receiving an auxiliary power supply voltage, a first switch coupled between the first power supply terminal and a power supply node, a second switch coupled between the second power supply terminal and the power supply node, a first internal circuit driven by the voltage of the first power supply terminal, a second internal circuit driven by the voltage of the power supply node, and a control circuit driven by the voltage of the power supply node. When the voltage of the first power supply terminal is higher than a first reference voltage, the control circuit turns on the first switch and turns off the second switch. When the voltage of the first power supply terminal is reduced to less than the first reference voltage, the control circuit turns on/off the first switch, and turns on/off the second switch so that the voltage of the power supply node is gradually increased.

In the semiconductor device according to the present invention, when the voltage of the first power supply terminal that receives the main power supply voltage is reduced to less than the first reference voltage, the first switch is turned on/off and the second switch is turned on/off so that the voltage of the power supply node is gradually increased. Thus, even if the voltage difference between the first power supply terminal and the second power supply terminal is large, it is possible to prevent unstable operation of the second internal circuit. Hereinafter, the semiconductor device according to the present invention will be described in detail with reference to the accompanying drawings.

First Embodiment

Figure 1:
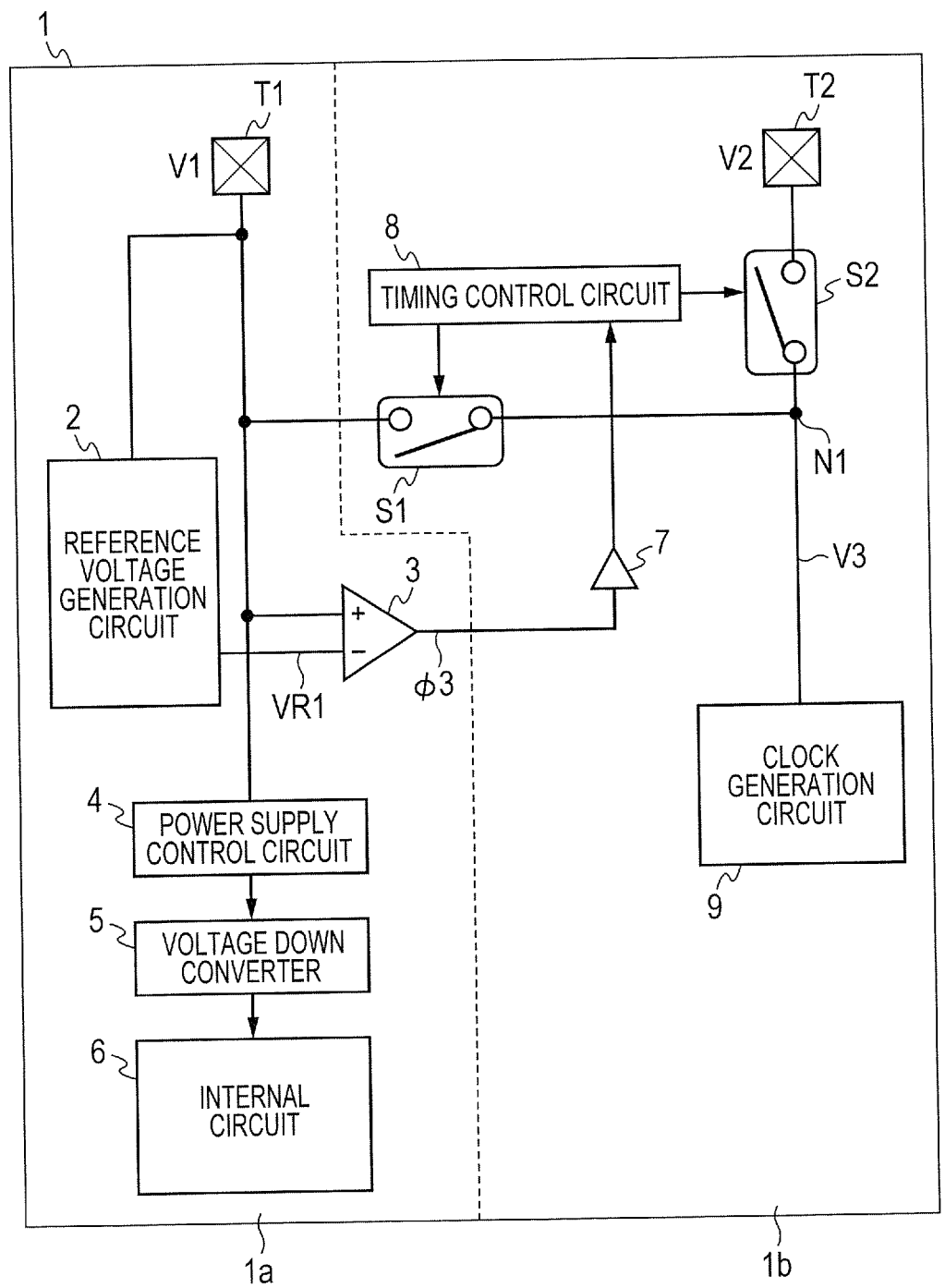
FIG. 1 is a circuit block diagram showing the configuration of a microcomputer according to a first embodiment of the present invention.

A microcomputer according to a first embodiment of the present invention includes a substrate 1 shown in FIG. 1. The surface of the substrate 1 is divided into two areas: a main power supply area 1a and an auxiliary power supply area 1b. The main power supply area 1a includes a main power supply terminal T1, a reference voltage generation circuit 2, a comparator circuit 3, a power supply control circuit 4, a voltage down converter 5, and an internal circuit 6.

The main power supply terminal T1 is coupled to a main power supply (for example, an alternating current (AC) adopter) and receives a main power supply voltage (for example, 2.7 V). The reference voltage generation circuit 2 is driven by a voltage V1 of the main power supply terminal T1. The reference voltage generation circuit 2 generates a reference voltage VR1. The value of the reference voltage VR1 is set so that the internal circuit 6 is reset when the voltage V1 of the main power supply terminal T1 is reduced to less than the reference voltage VR1.

The comparator circuit 3 is driven by the voltage V1 of the main power supply terminal T1. The comparator circuit 3 compares the voltage V1 of the main power supply terminal T1 with the reference voltage VR1. Then, the comparator circuit 3 outputs a signal φ3 indicating the comparison result. When V1 is higher than VR1, the signal φ3 is set to "H" level (voltage V1). When V1 is lower than VR1, the signal φ3 is set to "L" level (0V).

The power supply control circuit 4 is driven by the voltage V1 of the main power supply terminal T1 to control the voltage down converter 5 according to the operation mode (normal mode, standby mode, and the like) of the microcomputer. The voltage down converter 5 is controlled by the power supply control circuit 4 to lower the voltage V1 of the main power supply terminal T1. Then, the voltage down converter 5 provides the lowered voltage to the internal circuit 6. The output voltage of the voltage down converter 5 is set to a relatively high voltage in the normal mode, and to a relatively low voltage in the standby mode.

The internal circuit 6 includes a central processing unit (CPU), a static random access memory (SRAM), a flash memory, a peripheral circuit, and the like. The internal circuit 6 is driven by the output voltage of the voltage down converter 5. The internal circuit 6 performs program execution, data processing, and other operations.

The auxiliary power supply area 1b includes an auxiliary power supply terminal T2, switches S1 and S2, a buffer circuit 7, a timing control circuit 8, and a clock generation circuit 9. The auxiliary power supply terminal T2 is coupled to an auxiliary power supply (for example, a battery) to receive an auxiliary power supply voltage (for example, 3.6 V).

The switch S1 is coupled between the main power supply terminal T1 and a power supply node N1. The switch S2 is coupled between the auxiliary power supply terminal T2 and the power supply node N1. The buffer circuit 7 is driven by a voltage V3 of the power supply node N1. The buffer circuit 7 transmits the output signal φ3 of the comparator circuit 3 to the timing control circuit 8.

The timing control circuit 8 is driven by the voltage V3 of the power supply node N1. When the output signal of the buffer circuit 7 is the "H" level, the timing control circuit 8 turns on the switch S1 and turns off the switch S2. In this case, the voltage V1 of the main power supply terminal T1 is supplied to the power supply node N1 through the switch S1.

The timing control circuit 8 controls to turn on/off the switches S1 and S2 according to the change in the output signal of the buffer circuit 7. More specifically, the time when the switch S2 is turned on, Ton, and the time when the switch S2 is turned off, Toff, are alternately repeated. Then, the ON time Ton is gradually increased and the OFF time Toff is gradually reduced. In this way, the switch S2 is fixed to the ON state after a predetermined time has elapsed.

The clock generation circuit 9 includes a real time clock (RTC). The clock generation circuit 9 is driven by the voltage V3 of the power supply node N1 to generate a clock signal. Then, the clock generation circuit 9 supplies the output signal to the internal circuit 6.

Figure 2:
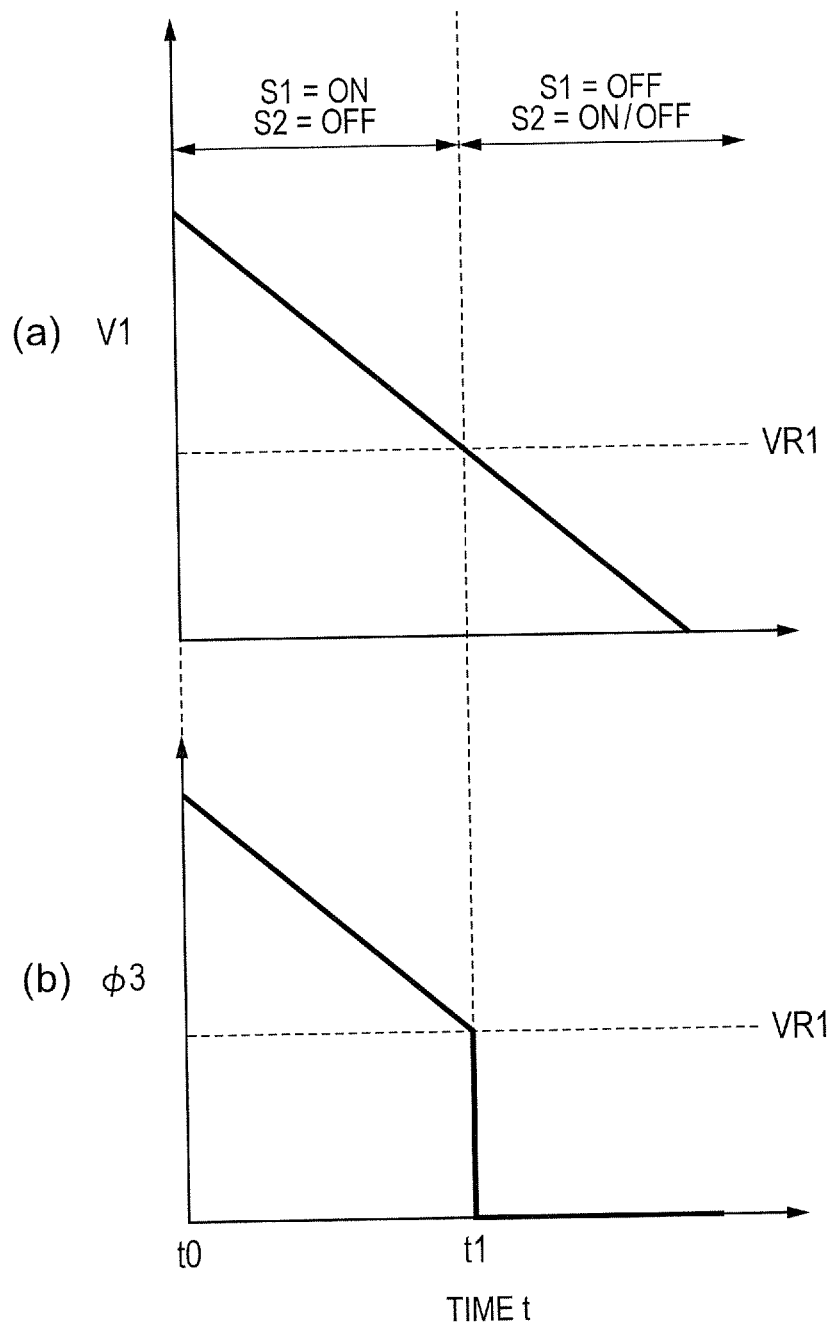
FIGS. 2A and 2B are timing charts illustrating the operation of the microcomputer shown in FIG. 1.

FIGS. 2A and 2B are timing charts illustrating the operation of the microcomputer according to the first embodiment. In particular, FIG. 2A shows the time change in the voltage V1 of the main power supply terminal T1, and FIG. 2B shows the time change in the output signal φ3 of the comparator circuit 3. In FIGS. 2A and 2B, the voltage V1 is gradually reduced with time from a certain time t0. In the period of time when the voltage V1 is higher than the reference voltage VR1 (time t0 to t1), the output signal φ3 of the comparator circuit 3 is set to the "H" level (voltage V1). At this time, the switch S1 is turned on and the switch S2 is turned off.

When the voltage V1 is reduced to less than the reference voltage VR1 at the time t1, the output signal φ3 of the comparator circuit 3 is lowered to the "L" level (0V) from the "H" level (voltage V1). When the signal φ3 is changed to the "L" level, the switch S1 is turned off, and the switch S2 is controlled to be turned on.

Figure 3:
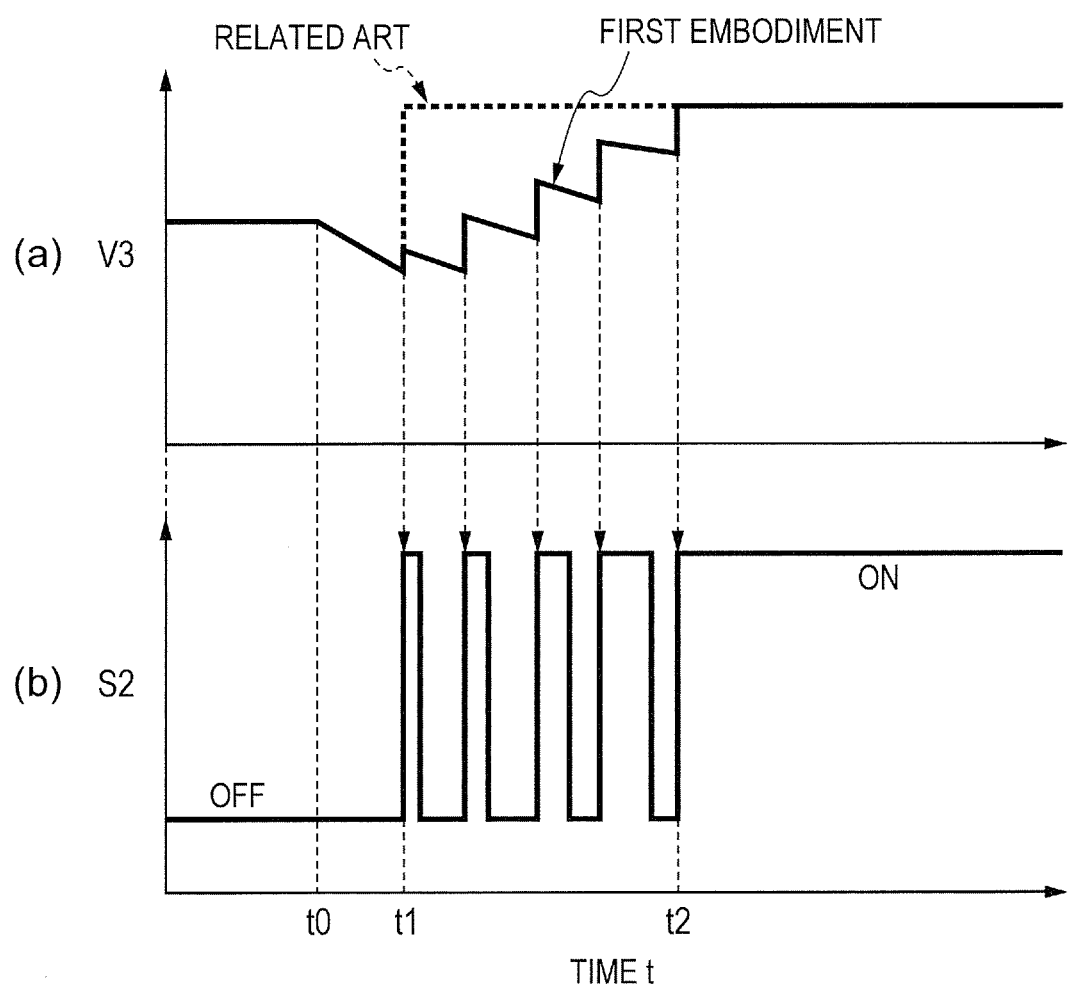
FIGS. 3A and 3B are other timing charts illustrating the operation of the microcomputer shown in FIG. 1.

FIGS. 3A and 3B are other timing charts illustrating the operation of the microcomputer according to the first embodiment. In particular, FIG. 3A shows the time change in the voltage V3 of the power supply node N1, and FIG. 3B shows the time change in the on/off operation of the switch S2. In FIGS. 3A and 3B, the voltage V1 of the main power supply terminal T1 is kept at normal value. The switch S2 is turned on and the switch S2 is turned off. In this way, the voltage V3 of the power supply node N1 is kept constant.

The voltages V1, V3 are gradually reduced from a certain time t0. When the voltage V1 is reduced to less than the reference voltage VR1 at the certain time t1, the switch S1 is turned off, and the switch S2 is controlled to be turned on/off. The time when the switch S2 is turned on (Ton), and the time when the switch S2 is turned off (Toff) alternately appear. The ON time Ton is gradually increased and the OFF time Toff is gradually reduced. Then, the switch S2 is fixed to the ON state at a time t2. In this way, the voltage V3 of the power supply node N1 is gradually increased and then is kept constant at the time t2. Note that the operations of the switches S1 and S2 can be reversed. In other words, it is possible that the switch S1 is turned off when the switch S2 is turned on and the switch is S1 is turned on when the switch S2 is turned off.

In the related art, since the switch S2 is fixed to the ON state at the time t1, the voltage V3 of the power supply node N1 is quickly increased as shown by the dotted line in FIG. 3A. As a result, the operation of the clock generation circuit 9 is unstable. On the other hand, in the first embodiment, the voltage V3 of the power supply node N1 is gradually increased, so that the operation of the clock generation circuit 9 is not unstable.

Second Embodiment

Figure 4:
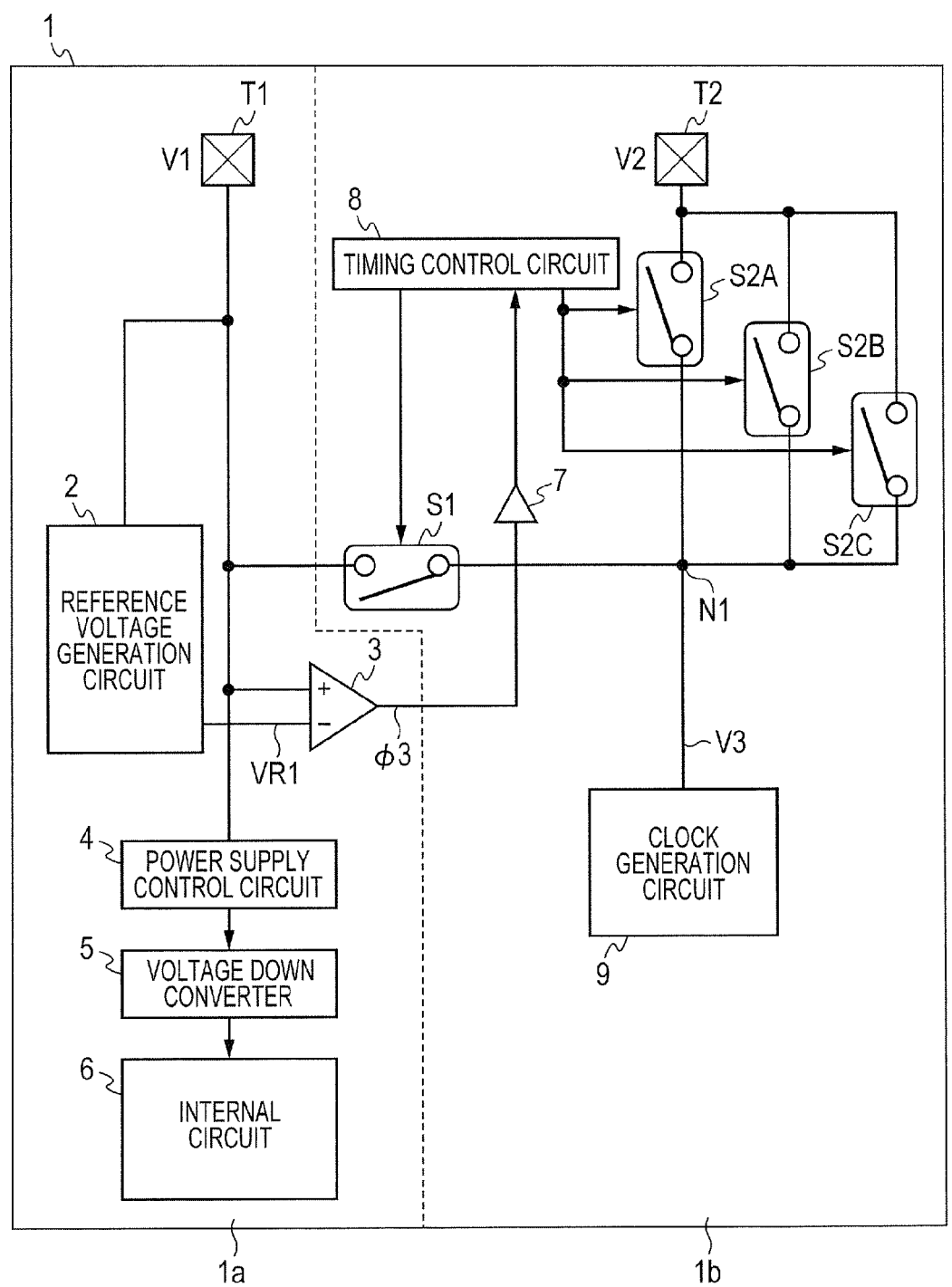
FIG. 4 is a circuit block diagram showing the configuration of a microcomputer according to a second embodiment of the present invention.

FIG. 4 is a circuit block diagram showing the configuration of a microcomputer according to a second embodiment of the present invention, which is to be compared with FIG. 1. The microcomputer shown in FIG. 4 is different from the microcomputer shown in FIG. 1 in that the switch S2 is replaced by a plurality of switches S2 (three in the figure), switches S2A, S2B, and S2C, which are coupled in parallel.

The on-resistances of the switches S2A, S2B, and S2C are sequentially reduced. In other words, when the on-resistances of the switches S2A, S2B, and S2C are Ra, Rb, and Rc, the following relationship is given: Ra>Rb>Rc. The switches S2A, S2B, and S2C are controlled by the timing control circuit 8.

The timing control circuit 8 is driven by the voltage V3 of the power supply node N1. When the output signal of the buffer circuit 7 is the "H" level, the timing control circuit 8 turns on the switch S1 and turns off the switches S2A, S2B, and S2C. In this case, the voltage V1 of the main power supply terminal T1 is supplied to the power supply node N1 through the switch S1.

When the output signal of the buffer circuit 7 is lowered from the "H" level to the "L" level, the timing control circuit 8 turns off the switch S1 and turns on the switch S2A, and turns on the switch S2B after a predetermined time has elapsed. After that, the timing control circuit 8 also turns on the switch S2C after a predetermined time has elapsed. In this way, the voltage V3 of the power supply node N1 is gradually increased.

Figure 5:
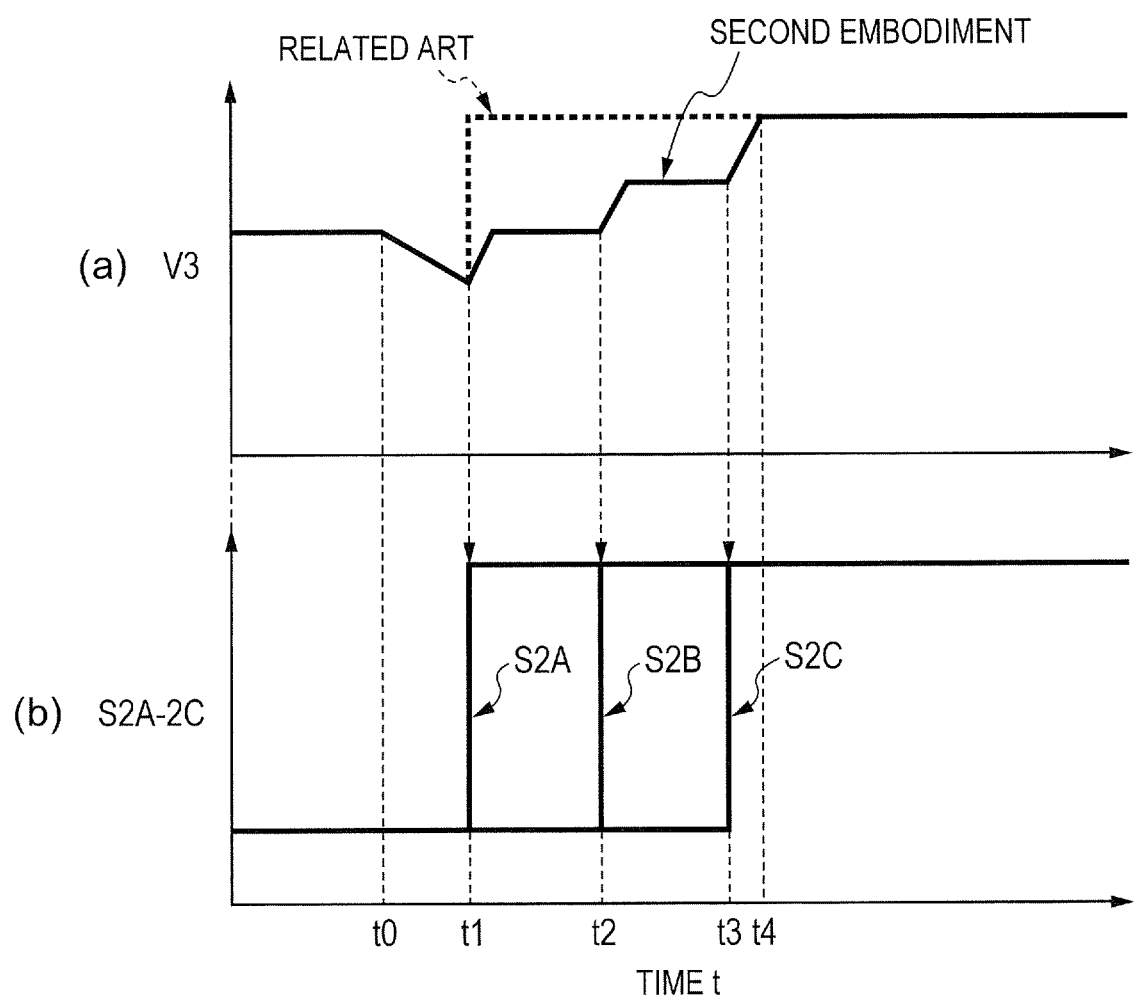
FIGS. 5A and 5B are timing charts illustrating the operation of the microcomputer shown in FIG. 4.

FIGS. 5A and 5B are timing charts illustrating the operation of the microcomputer according to the second embodiment. In particular, FIG. 5A shows the time change in the voltage V3 of the power supply node N1, and FIG. 5B shows the on/off operation of the switches S2A, S2B, and S2C. In FIGS. 5A and 5B, the voltage V1 of the main power supply terminal T1 is kept at normal value in the initial state. When the switch S1 is turned on, the switches S2A, S2B, and S2C are turned off. In this way, the voltage V3 of the power supply node N1 is kept constant.

The voltages V1, V3 are gradually reduced from a certain time t0. When the voltage V1 is reduced to less than the reference voltage VR1 at a certain time t1, the switch S1 is turned off and the switch S2A is turned on. The switch S2B is turned on at a time t2 after a predetermined time has elapsed from the time t1. Then, the switch S2C is turned on at a time t3 after a predetermined time has elapsed from the time t2. In this way, the voltage V3 of the power supply node N1 is gradually increased step by step, and is kept constant at a time t4.

Note that in the related art, since the switch S2 is fixed to the on state at the time t1, the voltage V3 of the power supply node N1 is quickly increased as shown by the dotted line in FIG. 5A. As a result, the operation of the clock generation circuit 9 is unstable. On the other hand, in the second embodiment, the voltage V3 of the power supply node N1 is gradually increased, so that the operation of the clock generation circuit is not unstable. The other configuration and operation are the same as those of the first embodiment and the description thereof will not be repeated.

Third Embodiment

Figure 6:
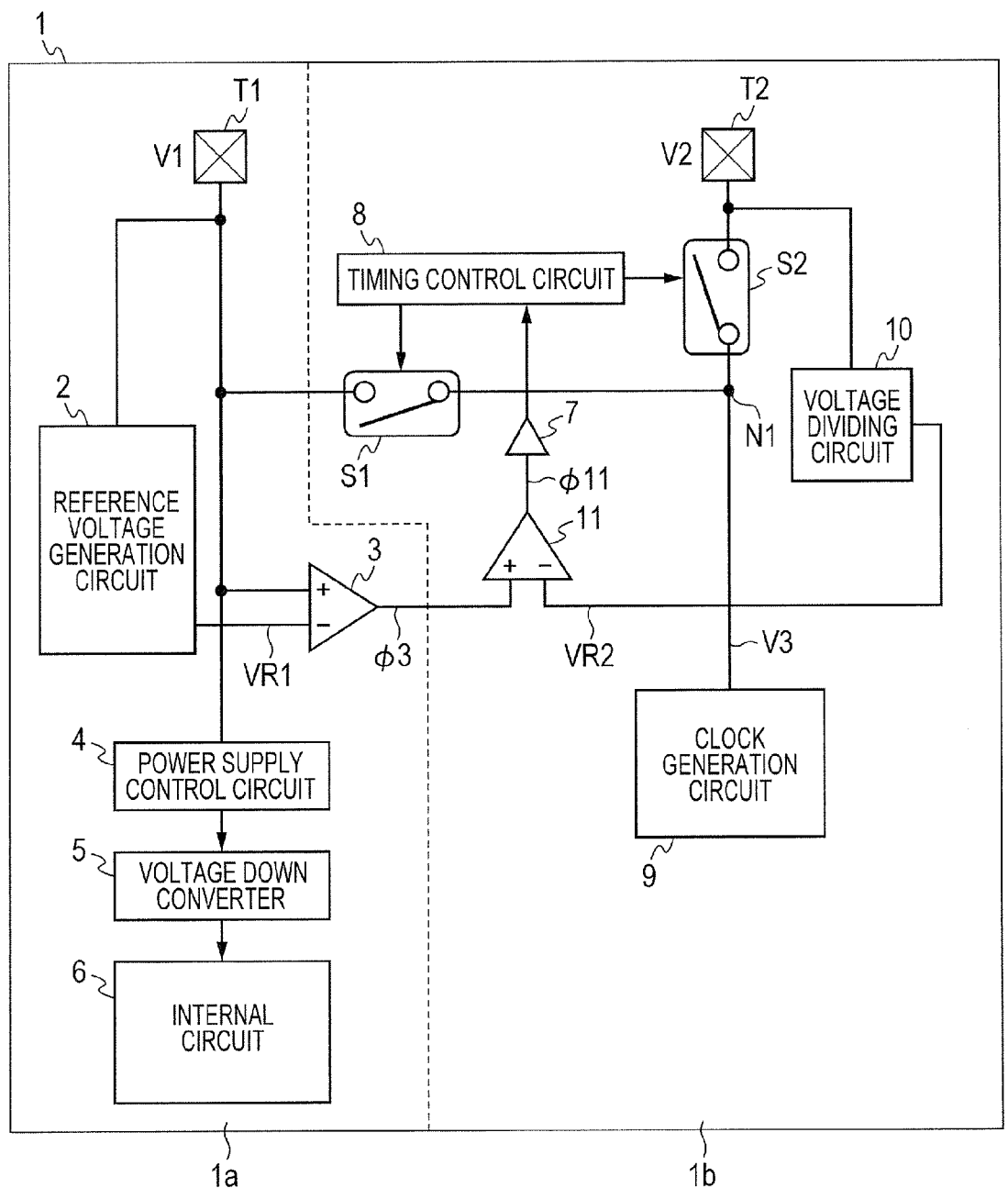
FIG. 6 is a circuit block diagram showing the configuration of a microcomputer according to a third embodiment of the present invention.

FIG. 6 is a circuit block diagram showing the configuration of a microcomputer according to a third embodiment of the present invention, which is to be compared with FIG. 1. The microcomputer shown in FIG. 6 is different from the microcomputer shown in FIG. 1 in that a voltage dividing circuit 10 and a comparator circuit 11 are added.

The voltage dividing circuit 10 divides the voltage V2 of the auxiliary power supply terminal T2 to generate a reference voltage VR2. The reference voltage VR2 is set to a voltage between the "H" level (voltage V1) and the "L" level (0V) of the output signal φ3 from the comparator circuit 3.

The comparator circuit 11 is driven by the voltage supplied by the voltage V2 of the auxiliary power supply terminal T2. The comparator circuit 11 compares the output signal φ3 of the comparator circuit 3 with the reference voltage VR2. Then, the comparator circuit 11 outputs a signal φ11 indicating the comparison result. When the voltage of the signal φ3 is higher than VR2, the signal φ11 is set to "H" level (voltage V2). When the voltage of the signal φ3 is lower than VR2, the signal φ11 is set to the "L" level (0V). The output signal φ11 from the comparator circuit 11 is provided to the timing control circuit 8 through the buffer circuit 7.

Figure 7:
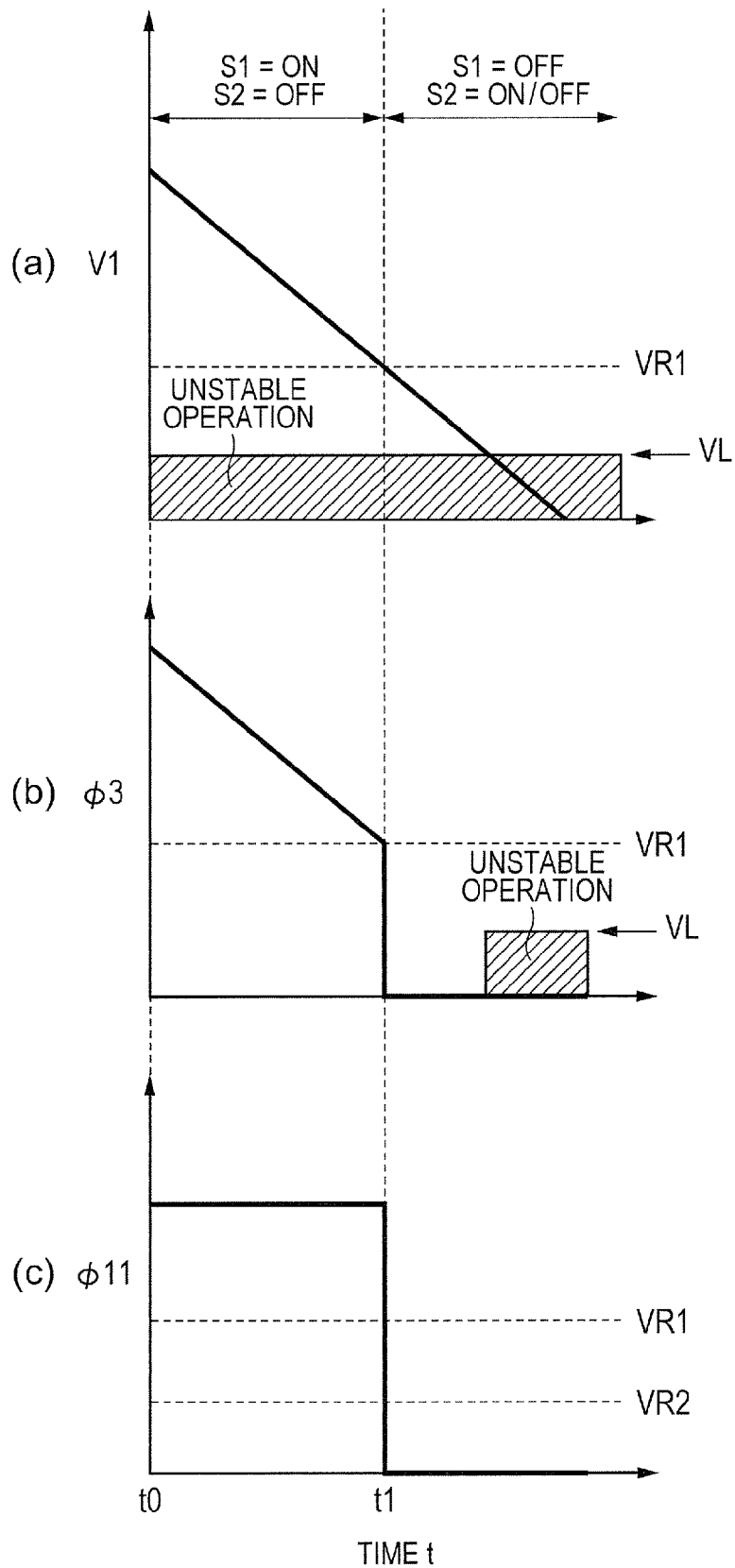
FIGS. 7A to 7C are timing charts illustrating the operation of the microcomputer shown in FIG. 6.

FIGS. 7A to 7C are timing charts illustrating the operation of the microcomputer described above. In particular, FIG. 7A shows the time change in the voltage V1 of the main power supply terminal T1, FIG. 7B shows the time change in the output signal φ3 of the comparator circuit 3, and FIG. 7C shows the time change in the output signal φ11 of the comparator circuit 11, respectively.

In FIGS. 7A to 7C, the voltage V1 is gradually lowered with time from a certain time t0. It is assumed that the voltage V2 of the auxiliary power supply terminal T2 is kept constant. In the period of time when the voltage V1 is higher than the reference voltage VR1 (time t0 to t1), the output signal φ3 from the comparator circuit 3 is set to the "H" level (voltage V1), and the output signal φ11 from the comparator circuit 11 is set to the "H" level (voltage V2). At this time, the switch S1 is turned on and the switch S2 is turned off.

When the voltage V1 is lower than the reference voltage VR1 at the time t1, the output signal φ3 of the comparator circuit 3 is lowered from the "H" level (voltage V1) to the "L" level (0V). Then, the output signal φ11 of the comparator circuit 11 is lowered from the "H" level (voltage V2) to the "L" level (0V). When the signal φ11 is set to the "L" level, the switch S1 is turned off. Then, the switch S2 is controlled to be turned on/off.

When the voltage V1 of the main power supply terminal T1 is further reduced to less than a predetermined voltage VL, the operation of the comparator circuit 3 driven by the voltage V1 is unstable. As a result, the logical level of the output signal φ3 of the comparator circuit 3 is unstable. However, the voltage of the output signal φ3 of the comparator circuit 3 is also reduced to less than VL. Thus, by setting VR2>VL, the comparator circuit 11 will output "L" level voltage even if the logical level of the output signal φ3 from the comparator circuit 3 is unstable. For this reason, the microcomputer according to the third embodiment can operate stably even when the voltage V1 of the main power supply terminal T1 is lower than the predetermined voltage VL. The other configuration and operation are the same as those of the first embodiment and the description thereof will not be repeated.

Fourth Embodiment

Figure 8:
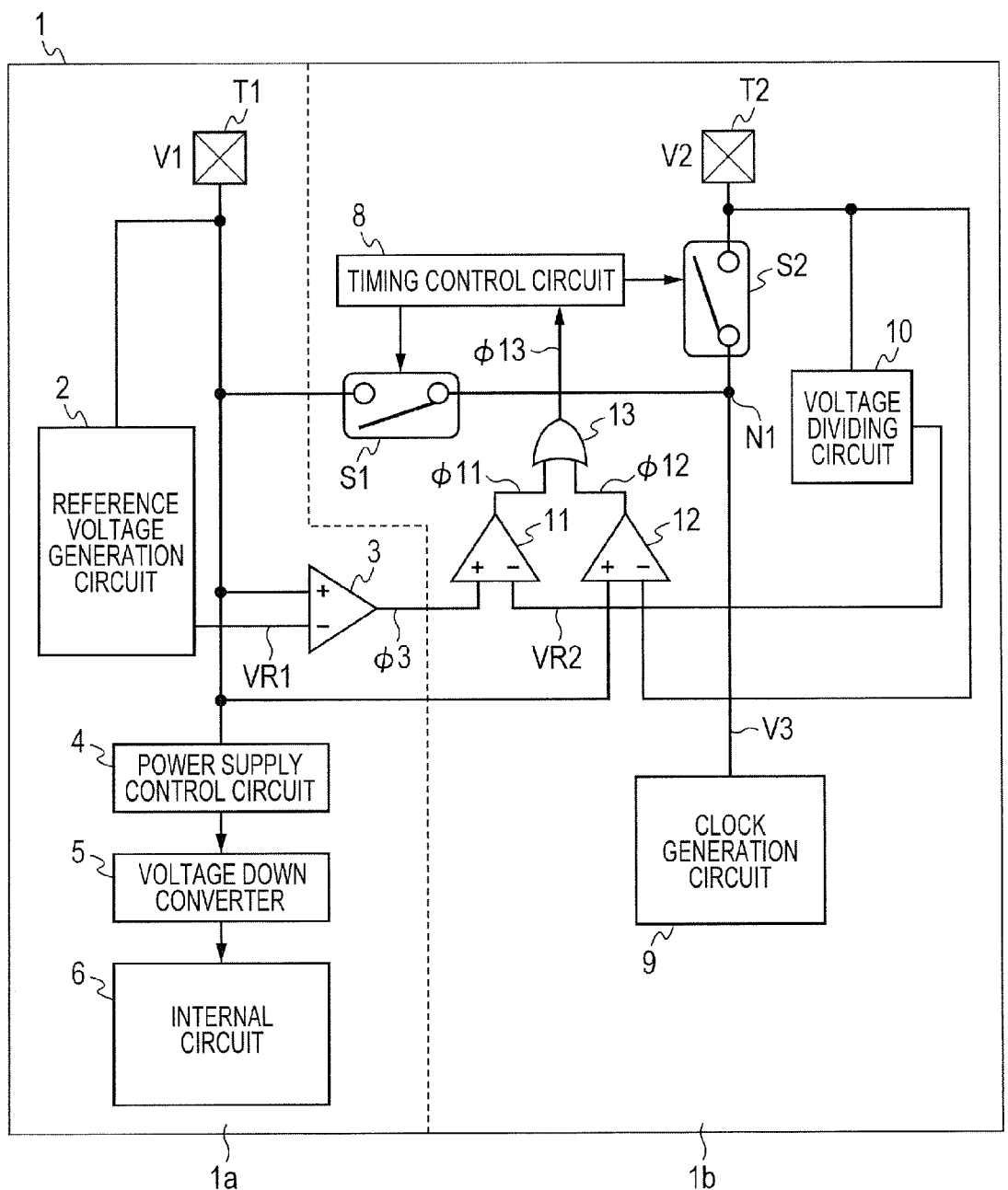
FIG. 8 is a circuit block diagram showing the configuration of a microcomputer according to a fourth embodiment of the present invention.

FIG. 8 is a circuit block diagram showing the configuration of a microcomputer according to a fourth embodiment of the present invention, which is to be compared with FIG. 6. The microcomputer shown in FIG. 8 is different from the microcomputer shown in FIG. 6 in that a comparator circuit 12 and an OR gate 13 are added.

The comparator circuit 12 is driven by the voltage supplied by the voltage V2 of the auxiliary power supply terminal T2. The comparator circuit 12 compares the voltage V1 of the main power supply terminal T1 with the voltage V2 of the auxiliary power supply terminal T2. Then, the comparator circuit 12 outputs a signal φ12 indicating the comparison result. When V1 is higher than V2, the signal φ12 is set to the "H" level (voltage V2). When V1 is lower than V2, the signal φ12 is set to the "L" level (0V). The OR gate 13 outputs a signal φ13, which is the logical sum of the output signal φ11 of the comparator circuit 11 and the output signal φ12 of the comparator circuit 12. The signal φ13 is provided to the timing control circuit 8.

When the voltage V1 of the main power supply terminal T1 is lower than the voltage V2 of the auxiliary power supply terminal T2, the output signal φ12 of the comparator circuit 12 is set to the "L" level. The OR gate 13 functions as the buffer circuit of the output signal φ11 from the comparator circuit 11. In this case, the configuration of the microcomputer shown in FIG. 8 is the same as the configuration of the microcomputer shown in FIG. 6.

When the voltage V1 of the main power supply terminal T1 is higher than the voltage V2 of the auxiliary power supply terminal T2, the output signal φ12 of the comparator circuit 12 is set to the "H" level. Then, the output signal φ13 of the OR gate 13 is kept at the "H" level, regardless of the output signal φ11 of the comparator circuit 11. Thus, the switch S1 is turned on and the switch S2 is turned off. Then, the voltage V1 of the main power supply terminal T1 is supplied to the power supply node N1.

Figure 9:
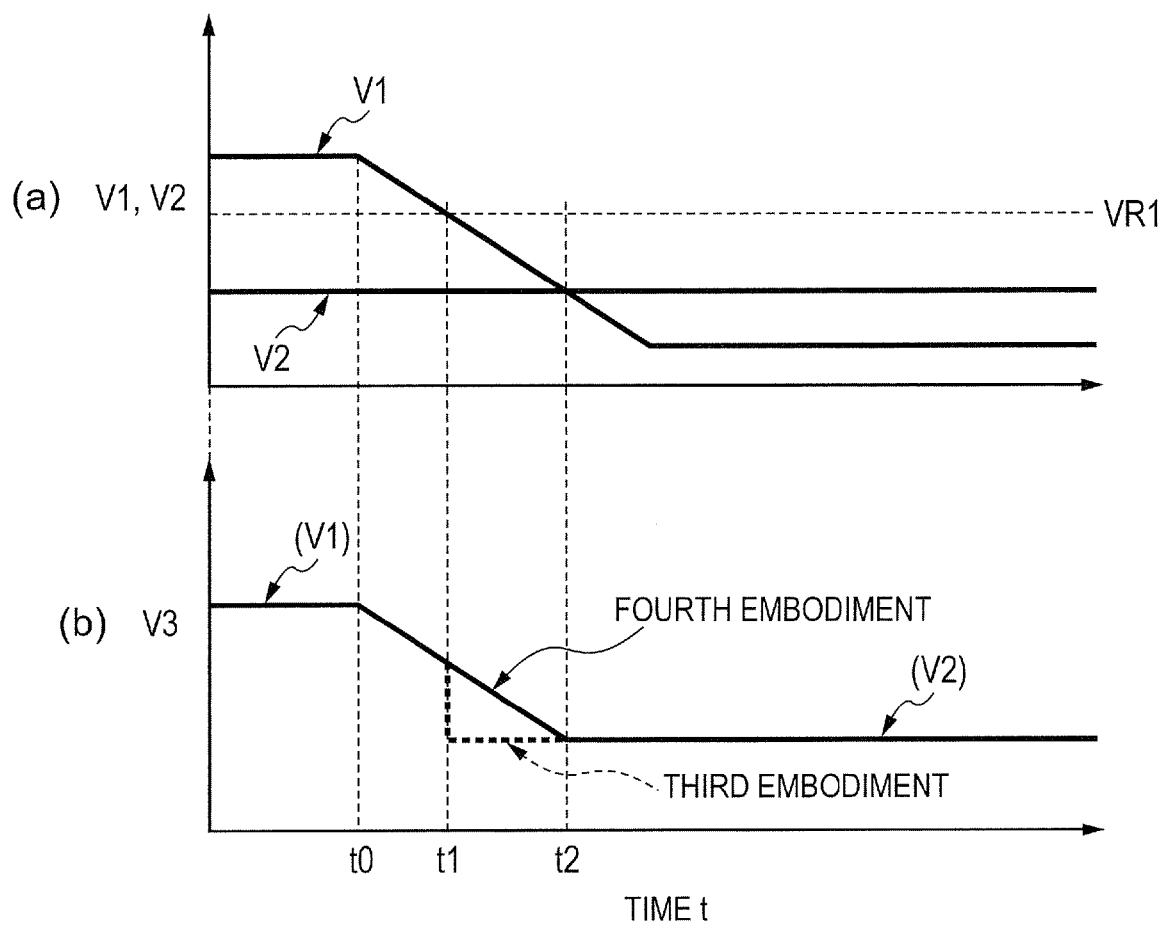
FIGS. 9A and 9B are timing charts illustrating the operation of the microcomputer shown in FIG. 8.

FIGS. 9A and 9B are timing charts illustrating the operation of the microcomputer according to the fourth embodiment. In particular, FIG. 9A shows the time change in the voltage V1 of the main power supply terminal T1 and the voltage V2 of the auxiliary power supply terminal T2. FIG. 9B shows the time change in the voltage V3 of the power supply node N1.

In FIGS. 9A and 9B, the voltage V1 is gradually reduced with time from a certain time t0. It is assumed that the voltage V2 of the auxiliary power supply terminal T2 is kept at a voltage that is lower than the reference voltage VR1. In the period of time when the voltage V1 is higher than the reference voltage VR1, the output signal φ3 of the comparator circuit 3 is set to the "H" level (voltage V1), and the output signal φ11 of the comparator circuit 11 is set to the "H" level (voltage V2). At this time, the switch S1 is turned on and the switch S2 is turned off. Thus, V3=V1.

When the voltage V1 is lower than the reference voltage VR1 at the time t1, the output signal φ3 of the comparator circuit 3 is lowered from the "H" level (voltage V1) to the "L" level (0V). Then, the output signal φ11 of the comparator circuit 11 is lowered from the "H" level (voltage V2) to the "L" level (0V).

In the third embodiment, the switch S1 is turned off at the time when the signal φ11 is changed to the "L" level. At this time, the switch S2 is controlled to be turned on/off. Thus, V3=V2 as shown by the dotted line in FIG. 9B. Note that in FIG. 9B, for simplifying the illustration and description, it is assumed that V3=V2 immediately at the time t1.

However, in the fourth embodiment, when V1<VR1, the output signal φ12 of the comparator circuit 12 is kept at the "H" level for the period of V1>V2 (time t1 to t2). Thus, the state of V3=V1 remains.

When V1<V2 at the time t2, the output signal φ12 of the comparator circuit 12 is changed to the "L" level. Then, the output signal φ13 of the OR gate 13 is changed to the "L" level. When the signal φ13 is changed to the "L" level, the switch S1 is turned off. Then, the switch S2 is controlled to be turned on/off. Thus, V3 V2 as shown by the solid line in FIG. 9B.

In the fourth embodiment, when the voltage V1 of the main power supply terminal T1 is reduced to less than the reference voltage VR1, the voltage V1 of the main power supply terminal T1 is supplied to the power supply node N1 in the period of time when the voltage V1 of the main power supply terminal T1 is higher than the voltage V2 of the auxiliary power supply terminal T2. Thus, V1 can be continuously used as long as V1>V2.

Fifth Embodiment

Figure 10:
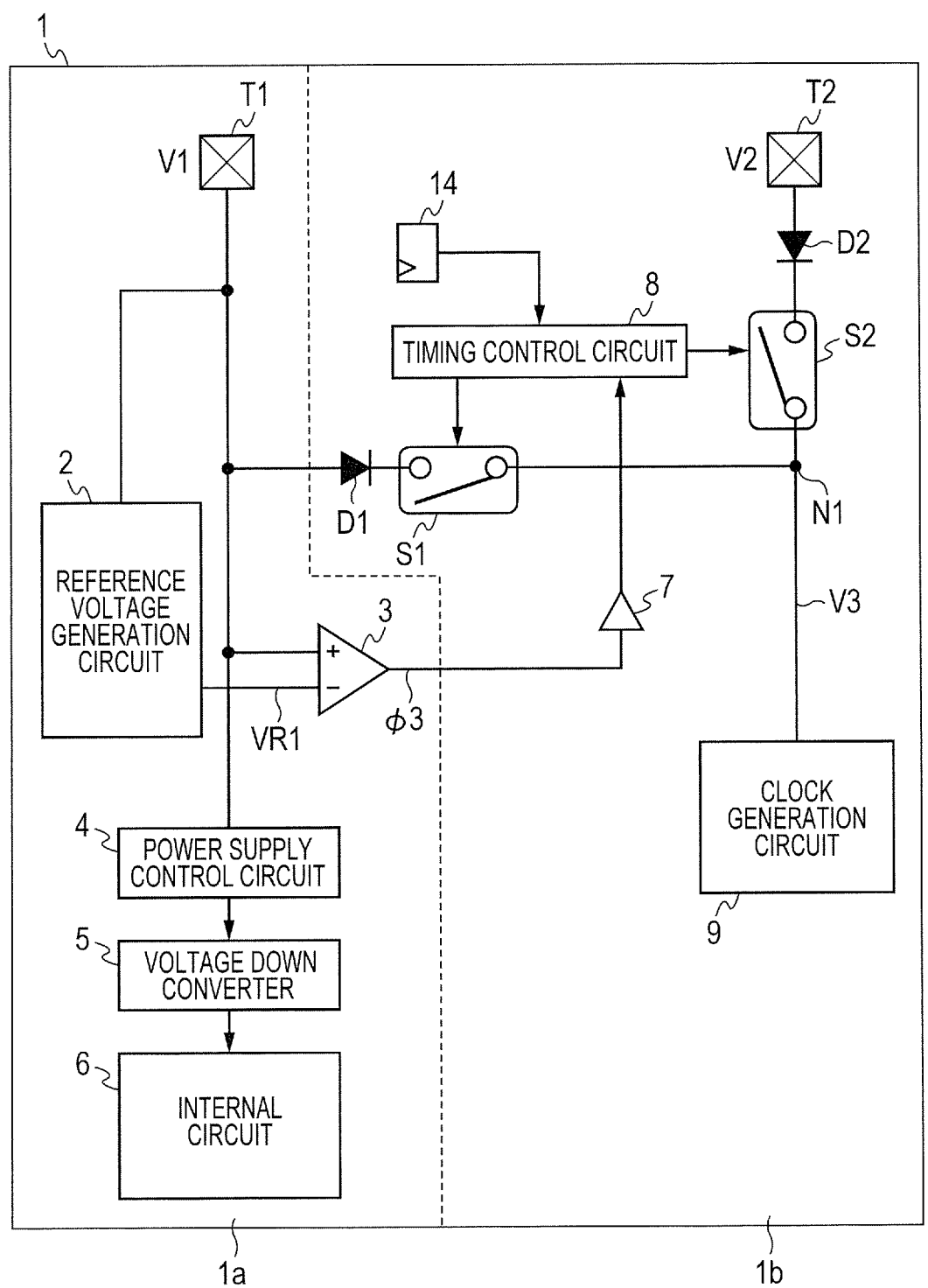
FIG. 10 is a circuit block diagram showing the configuration of a microcomputer according to a fifth embodiment.

FIG. 10 is a circuit block diagram showing the configuration of a microcomputer according to a fifth embodiment of the present invention, which is to be compared with FIG. 1. The microcomputer shown in FIG. 10 is different from the microcomputer shown in FIG. 1 in that diodes D1, D2, and a register 14 are added.

The anode of the diode D1 is coupled to the main power supply terminal T1. The cathode of the diode D1 is coupled to the power supply node N1 through the switch S1. The anode of the diode D2 is coupled to the auxiliary power supply terminal T2. The cathode of the diode D2 is coupled to the power supply node N1 through the switch 52.

A signal of "H" level or "L" level is written in the register 14. The written "H" level or "L" level signal is stored in the register 14, and is output to the timing control circuit 8.

When the output signal of the register 14 is the "L" level, the timing control circuit 8 controls the switches S1 and S2, similarly to the first embodiment. When the output signal of the register 14 is the "H" level, the timing control circuit 8 fixes the switches S1 and S2 to the on state. When the switches S1 and S2 are fixed to the on state, the cathode of the diodes D1 and D2 is both coupled to the power supply node N1. In this case, the higher voltage of the two voltages, V1 and V2, is supplied to the power supply node N1.

In other words, when V1>V2, the diode D1 is turned on and the diode D2 is turned off. Then, the voltage V1 of the main power supply terminal T1 is supplied to the power supply node N1 through the diode D1 and the switch S1. On the other hand, when V1<V2, the diode D1 is turned off and the diode D2 is turned on. Then, the voltage V2 of the auxiliary power supply terminal T2 is supplied to the power supply node N1 through the diode D2 and the switch S2.

In the fifth embodiment, the same effect as the first embodiment can be obtained. In addition, since the higher voltage of the two voltages, V1 and V2, can be supplied to the power supply node N1, it is effective in protecting against instantaneous power interruption in the main power supply or in the auxiliary power supply.

Sixth Embodiment

Figure 11:
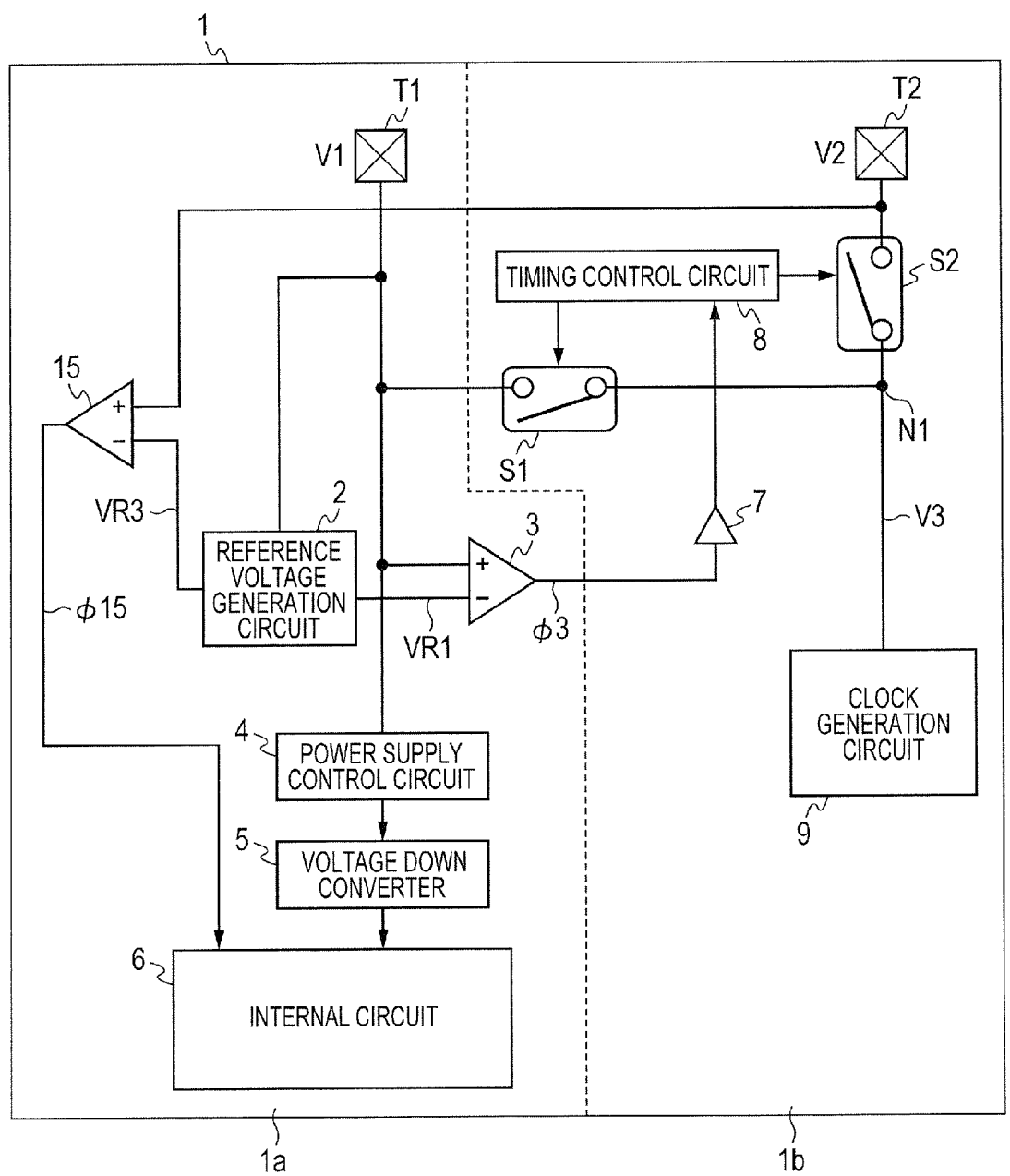
FIG. 11 is a circuit block diagram showing the configuration of a microcomputer according to a sixth embodiment.

FIG. 11 is a circuit block diagram showing the configuration of a microcomputer according to a sixth embodiment of the present invention, which is to be compared with FIG. 1. The microcomputer shown in FIG. 11 is different from the microcomputer shown in FIG. 1 in that a comparator circuit 15 is added and that the reference voltage generation circuit 2 also generates a reference voltage VR3.

The comparator circuit 15 is driven by the voltage V1 of the main power supply terminal T1. The comparator circuit 15 compares the voltage V2 of the auxiliary power supply terminal T2 with the reference voltage VR3. Then, the comparator circuit 15 outputs a signal φ15 indicating the comparison result. When V2 is higher than VR3, the signal φ15 is set to the "H" level (voltage V1). When V2 is lower than VR3, the signal φ15 is set to the "L" level (0V). The signal φ15 is provided to the internal circuit 6. When the signal φ15 is changed to the "L" level, the internal circuit 6 outputs a signal to notify the user of the microcomputer that the voltage V2 of the auxiliary power supply terminal T2 is reduced.

FIGS. 12A and 12B are timing charts illustrating the operation of the microcomputer according to the sixth embodiment, in which FIG. 12A shows the time change in the voltage V1 of the main power supply terminal T1, and FIG. 12B shows the time change in the voltage V2 of the auxiliary power supply terminal T2. Further, FIG. 12C shows the time change in the state of the comparator circuit 15.

In FIGS. 12A to 12C, it is assumed that the voltage V1 of the main power supply terminal T1 is changed. The comparator circuit 15 is driven by the voltage 1. When the voltage V1 is higher than a predetermined voltage V1A, the detection operation can be performed (time t0 to t1, after time t3). However, when the voltage V1 is lower than the predetermined voltage V1A, the detection operation may not be performed (time t1 to t3).

Further, it is assumed that the voltage V2 of the auxiliary power supply terminal T2 is gradually reduced from a certain time t2. When the voltage V2 is lower than the reference voltage VR3, the comparator circuit 15 lowers the signal φ15 from the "H" level to the "L" level.

In the sixth embodiment, the same effect as the first embodiment can be obtained. In addition, it is also possible to notify the user of the microcomputer that the voltage V2 of the auxiliary power supply terminal T2 is lower than the reference voltage VR3.

The embodiments disclosed herein are to be considered in all respects as illustrative and not restrictive. The scope of the present invention is indicated by the appended claims, rather than by the foregoing description, and all changes which come within the meaning and range of equivalency of the claims are therefore intended to be embraced therein.

What is claimed:
1. A semiconductor device comprising:
   a first power supply terminal for receiving a main power supply voltage;
   a second power supply terminal for receiving an auxiliary power supply voltage;
   a first switch coupled between the first power supply terminal and a power supply node;
   second to Nth switches (N is an integer equal to 3 or higher) that are coupled in parallel between the second power supply terminal and the power supply node;
   a first internal circuit driven by the voltage of the first power supply terminal;
   a second internal circuit driven by the voltage of the power supply node; and
   a control circuit driven by the voltage of the power supply node,
   wherein when the voltage of the first power supply terminal is higher than a first reference voltage, the control circuit turns on the first switch and turns off the second to Nth switches, and when the voltage of the first power supply terminal is reduced to less than the first reference voltage, the control circuit turns off the first switch, and while the first switch is turned off, sequentially turns on the second to Nth switches to cause the voltage of the power supply node to gradually increase.

2. The semiconductor device according to claim 1, wherein the on-resistances of the second to (N−1)th switches are greater than the on-resistances of the third to Nth switches, respectively.

* * * * *